(12) United States Patent
Allard et al.

(10) Patent No.: US 8,161,768 B2
(45) Date of Patent: Apr. 24, 2012

(54) MODULAR FOOD PRESERVATION SYSTEM

(75) Inventors: Paul B. Allard, Stevensville, MI (US); Douglas D. Leclear, Benton Harbor, MI (US); Andrew M. Tenbarge, Saint Joseph, MI (US); John J. Vonderhaar, Saint Joseph, MI (US); Michele E. Wilcox, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 620 days.

(21) Appl. No.: 12/402,534

(22) Filed: Mar. 12, 2009

(65) Prior Publication Data

US 2009/0229296 A1 Sep. 17, 2009

Related U.S. Application Data

(63) Continuation-in-part of application No. 12/343,682, filed on Dec. 24, 2008, and a continuation-in-part of application No. 12/343,690, filed on Dec. 24, 2008, now Pat. No. 8,020,360, and a continuation-in-part of application No. 12/343,696, filed on Dec. 24, 2008.

(60) Provisional application No. 61/035,775, filed on Mar. 12, 2008.

(51) Int. Cl.
*F25D 19/00* (2006.01)

(52) U.S. Cl. ........................................ 62/449; 62/457.9

(58) Field of Classification Search .............. 62/77, 331, 62/440, 448, 449, 457.9
See application file for complete search history.

(56) References Cited

U.S. PATENT DOCUMENTS

| 5,009,081 | A | * | 4/1991 | Kruck et al. | .................... 62/264 |
| 5,271,240 | A |  | 12/1993 | Detrick et al. | |
| 5,893,822 | A |  | 4/1999 | Deni et al. | |
| 6,090,422 | A |  | 7/2000 | Taragan et al. | |
| 6,109,053 | A | * | 8/2000 | Strackbein et al. | .......... 62/259.1 |
| 6,148,875 | A |  | 11/2000 | Breen | |
| 6,256,968 | B1 |  | 7/2001 | Kristen | |
| 6,789,690 | B2 |  | 9/2004 | Nieh et al. | |
| 7,331,163 | B2 |  | 2/2008 | Hau et al. | |
| 2002/0083724 | A1 |  | 7/2002 | Tarlow et al. | |
| 2006/0010890 | A1 |  | 1/2006 | Feinauer et al. | |

* cited by examiner

*Primary Examiner* — Melvin Jones

(74) *Attorney, Agent, or Firm* — Kirk W. Goodwin; Price Reneveld, LLP

(57) ABSTRACT

A refrigerator includes a cabinet defining an open storage space and including a door having an interior side adapted to receive a modular component. The modular component has a base removably connected to the interior side of the door. A component door is hingedly-connected to the base and includes a viewing area. The component door is operable between an open position and a closed position and the base and the component door define a sealed compartment when the component door is in the closed position. An air hose extends from the modular component. The air hose has a proximal end and a distal end. A fastener system is disposed on one of the component door and the base. The fastener system is adapted to engage with the first fasteners to create a seal between the component door and the base. A heat sealer is disposed on one of the base and the component door.

20 Claims, 12 Drawing Sheets

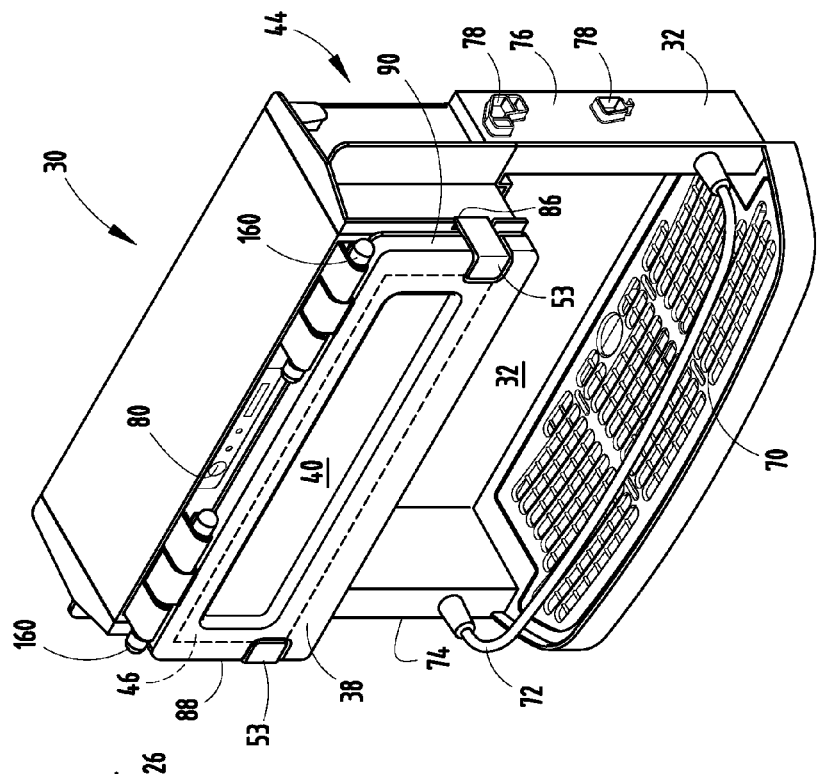
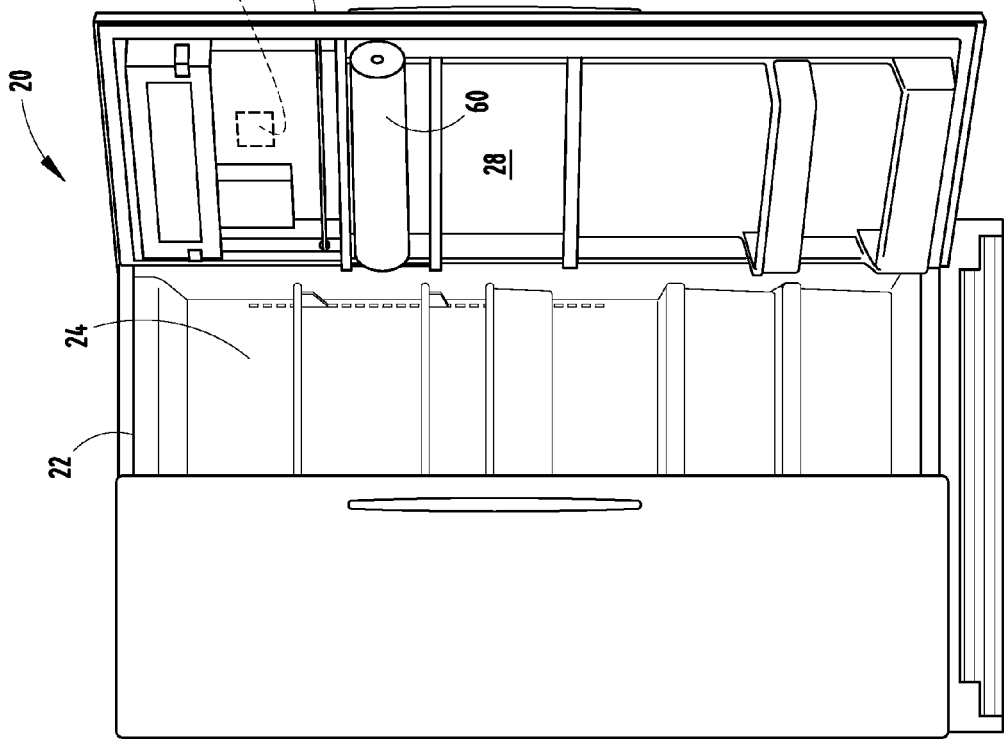

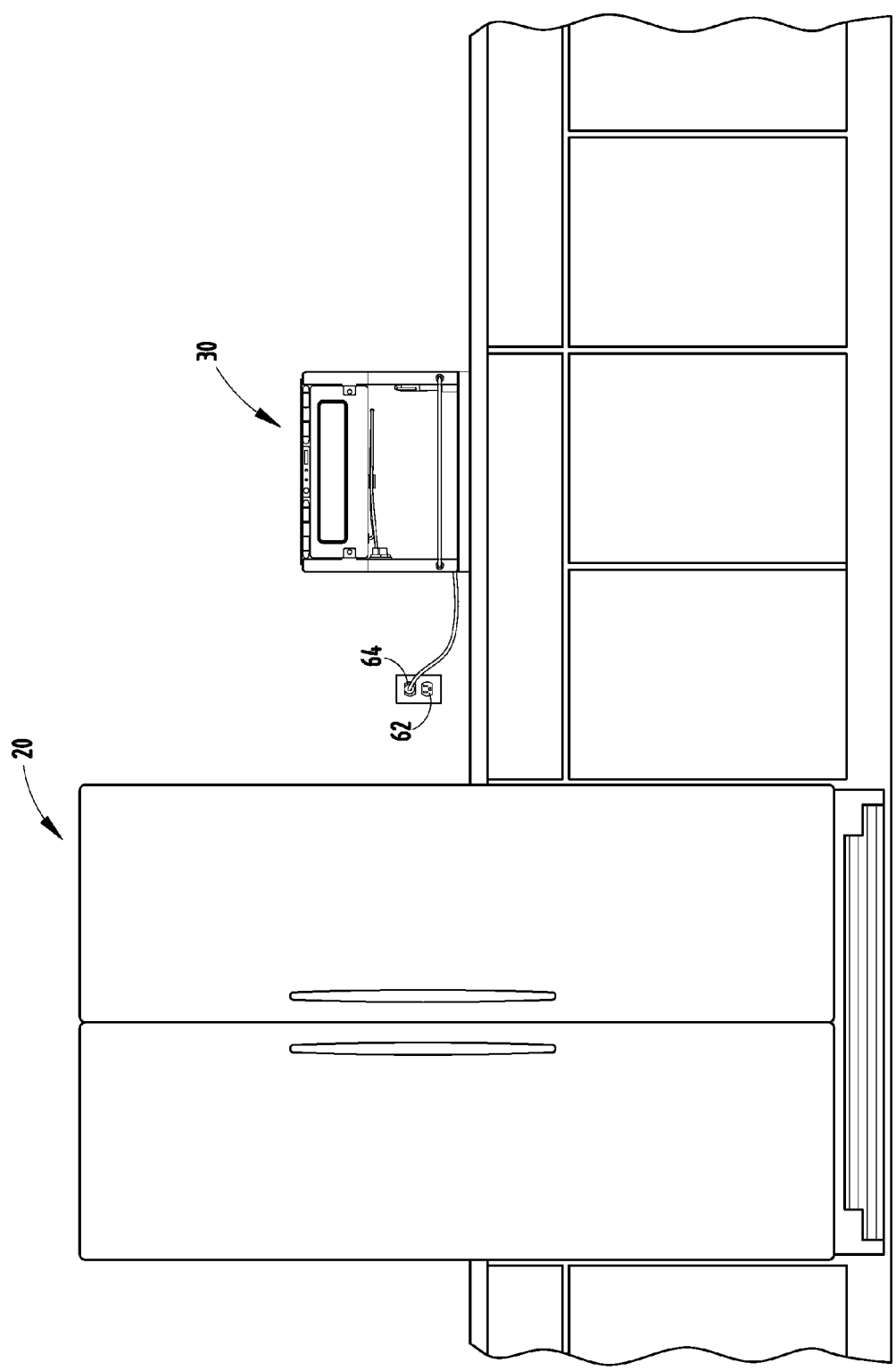

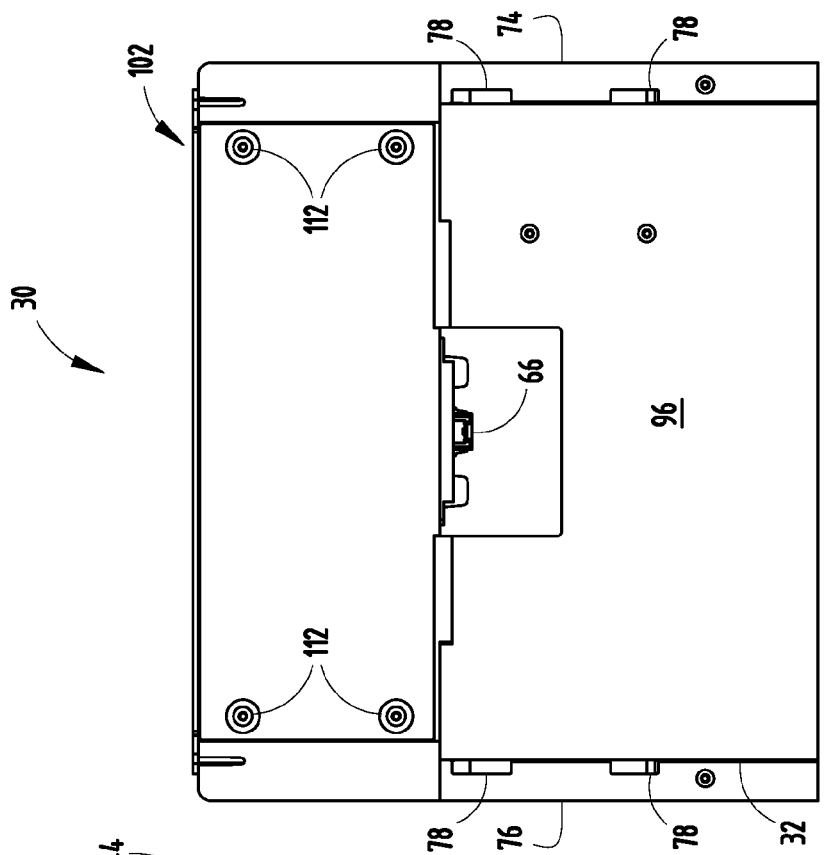
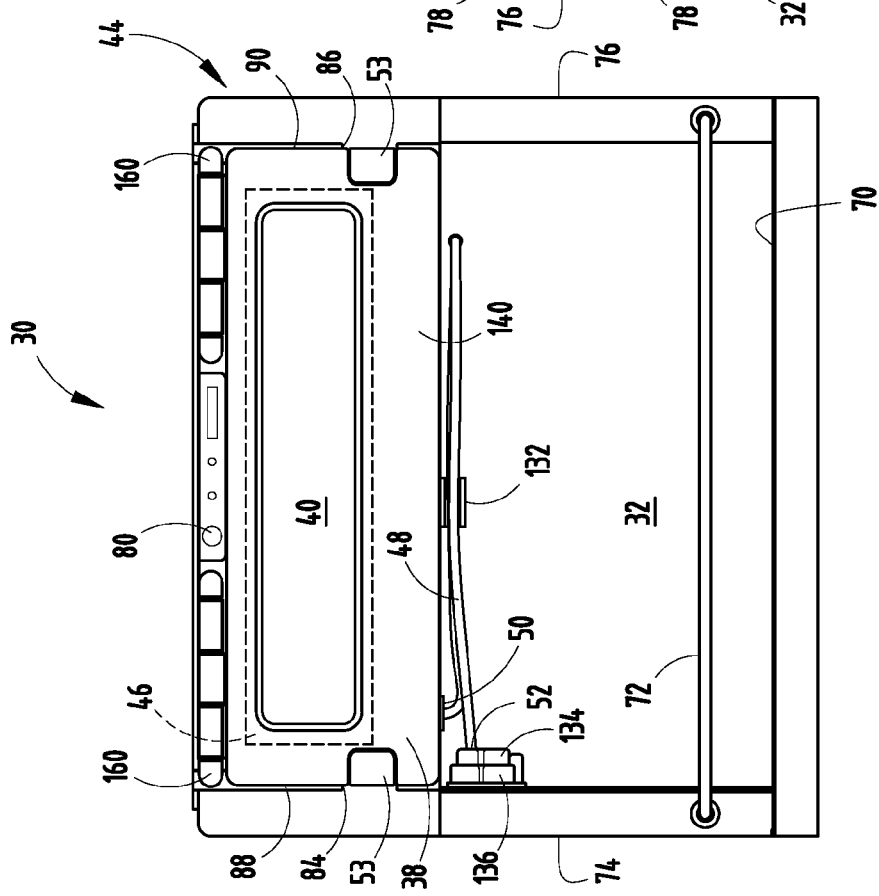

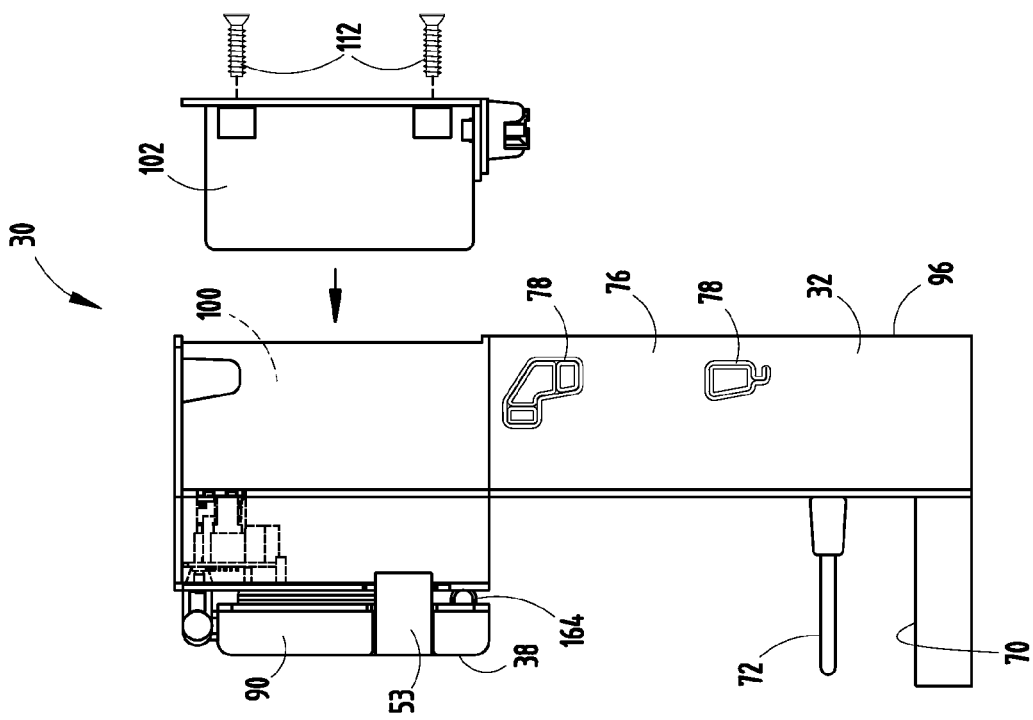
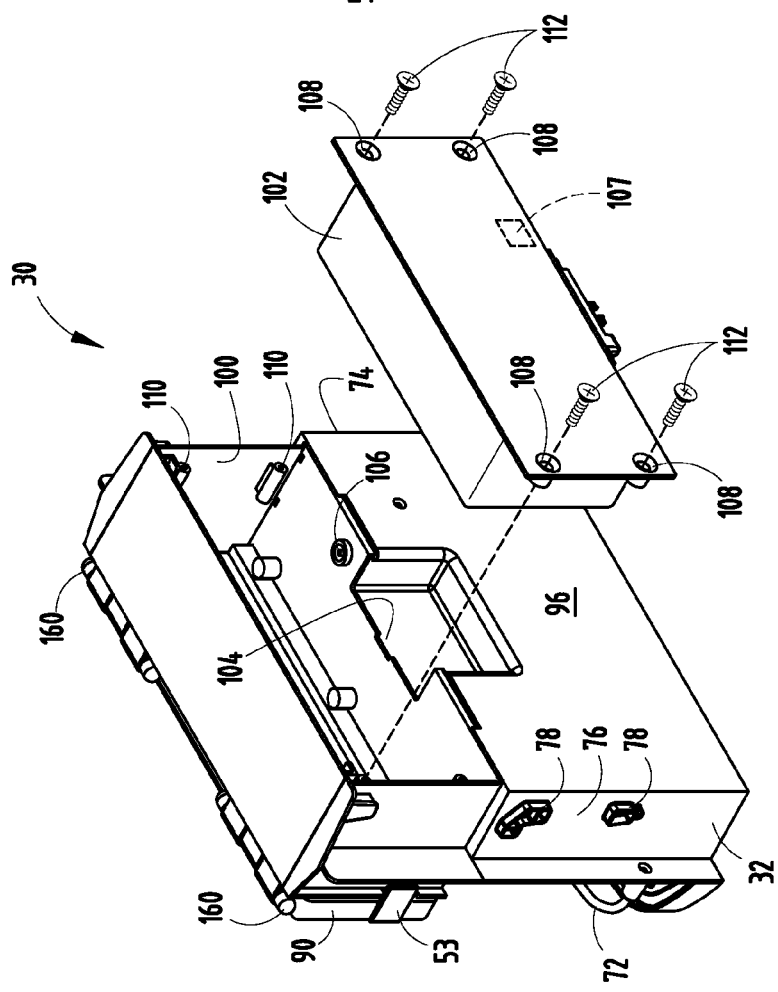

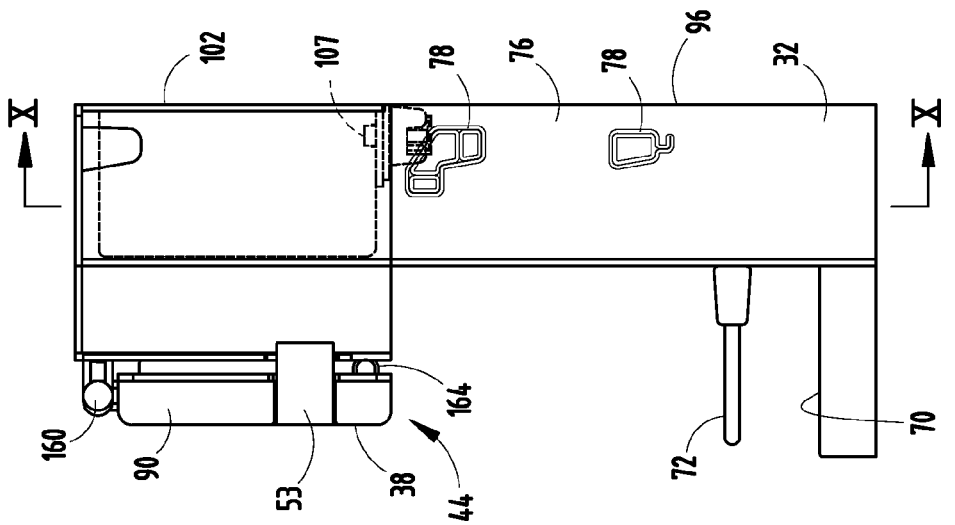
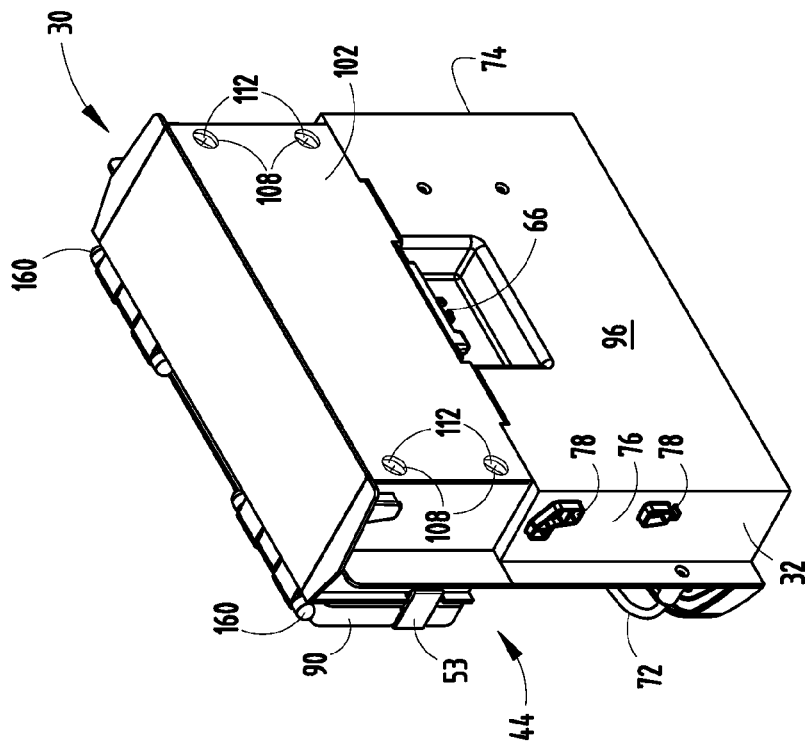

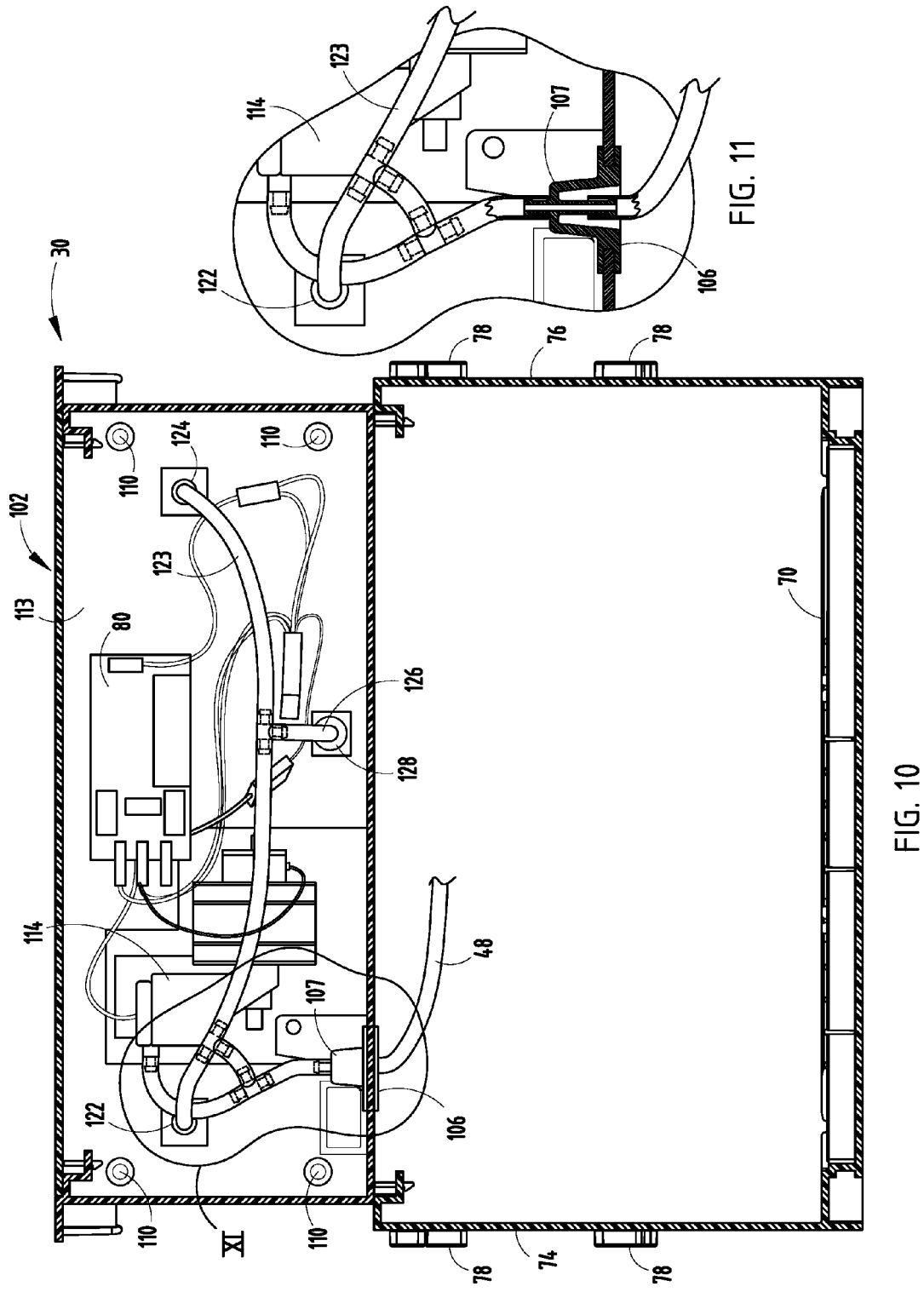

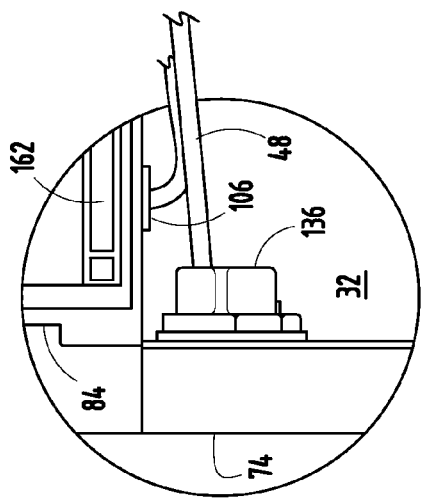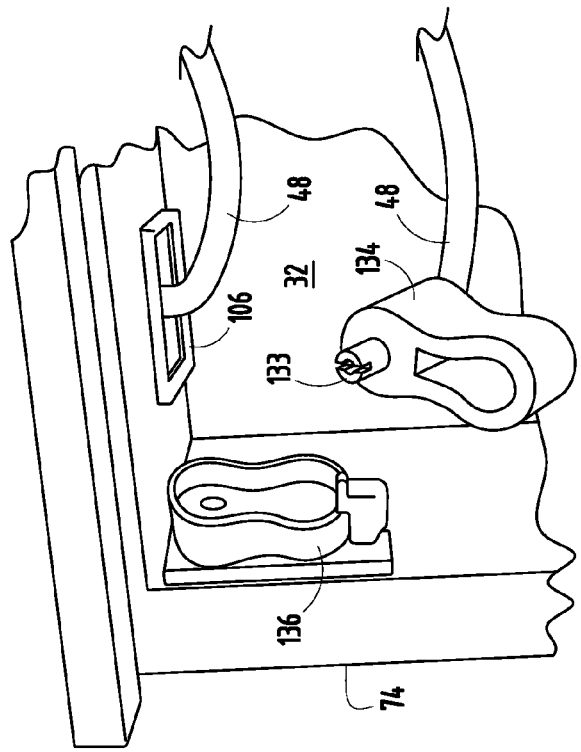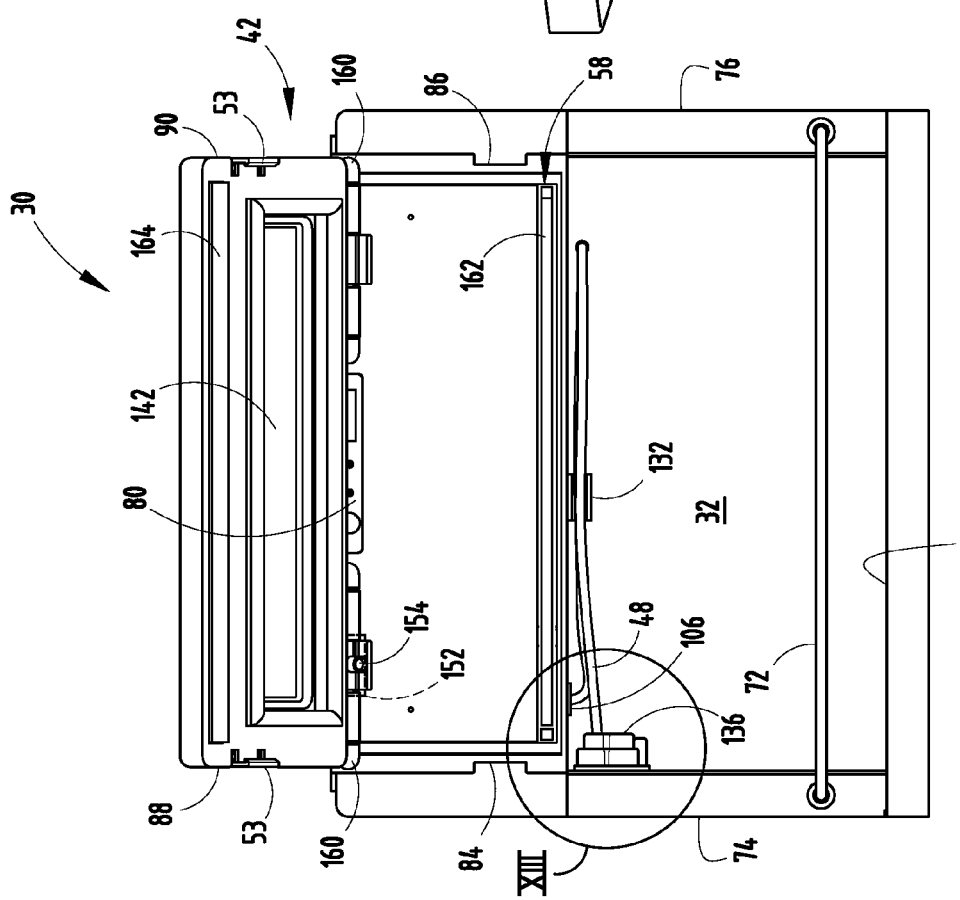

MODULAR FOOD PRESERVATION SYSTEM

CROSS-REFERENCE TO RELATED APPLICATIONS

This application is a continuation-in-part of U.S. patent application Ser. No. 12/343,682, entitled "MODIFIED ATMOSPHERE FOR FOOD PRESERVATION," filed on Dec. 24, 2008; U.S. patent application Ser. No. 12/343,690, entitled "DEVICE AND METHOD TO PRODUCE A MODIFIED ATMOSPHERE FOR FOOD PRESERVATION," filed on Dec. 24, 2008; U.S. patent application Ser. No. 12/343,696, entitled "MODIFIED ATMOSPHERE FOR FOOD PRESERVATION," filed on Dec. 24, 2008; and claims priority under 35 U.S.C. §119(e) to U.S. Provisional Patent Application No. 61/035,775, entitled "REFRIGERATOR WITH SPACE MANAGEMENT MODULES," filed on Mar. 12, 2008, the entire disclosures of which are hereby incorporated by reference.

BACKGROUND OF THE PRESENT INVENTION

The present invention generally relates to a food preservation system and, more specifically, to a modular food preservation system for a refrigerator.

SUMMARY OF THE INVENTION

In one aspect of the present invention, a refrigerator includes a cabinet defining an open storage space and has a refrigerator door with an interior side adapted to receive a modular component. The modular component has a base removably connected to the interior side of the refrigerator door. A component door is hingedly-connected to the base and includes a viewing area. The component door is operable between an open position and a closed position and the base and the component door define a sealed compartment when the component door is in the closed position. An air hose extends from the modular component. The air hose has a proximal end and a distal end. A fastening system is disposed on one of the component door and the base. The fastening system is adapted to engage with the first fasteners to create a seal between the component door and the base. A heat sealer is disposed on one of the base and the component door.

In another aspect of the present invention, a modular component is removably attachable to an interior compartment of a refrigerator and includes a base removably connected to the interior compartment. A component door is hingedly-connected to the base and has first fasteners. The component door is operable between an open position and a closed position. The base and component door define a sealed compartment when the component door is in the closed position. Second fasteners are disposed on the base and adapted to detachably connect with the first fasteners on the component door. The modular component also includes a receptacle adapted to receive and interface with a removable modular sub-assembly. A hose is connected to the receptacle and is in communication with the modular sub-assembly. A heat sealer is disposed on one of the component door and the base.

In yet another aspect of the present invention, a method of modifying the contents of a sealable container includes providing a refrigerator with an interior portion. The modular component is provided with a base. The base of the modular component removably connects the modular component to the interior portion of the refrigerator. A component door is hingedly-connected to the base and is operable between an open position and a closed position. The base and the component door define a sealed compartment when the component door is in the closed position. A modular sub-assembly is inserted into the modular component. A hose is in communication with the modular sub-assembly, and a heat sealer is connected to one of the component door and the base.

These and other features, advantages and objects of the present invention will be further understood and appreciated by those skilled in the art upon studying the following specification, claims, and appended drawings.

BRIEF DESCRIPTION OF THE DRAWINGS

FIG. 1 is a front elevational view of a refrigerator incorporating one embodiment of a food preservation system of the present invention;

FIG. 2 is a front elevational view of the food preservation system removed from the refrigerator and placed on a counter;

FIG. 3 is a top perspective view of the food preservation system of FIG. 1;

FIG. 4 is a front elevational view of the food preservation system with the component door in the closed position of FIG. 2;

FIG. 5 is a rear elevational view of the food preservation system;

FIG. 6 is a rear perspective view of the food preservation system prior to engagement with a modular sub-assembly;

FIG. 7 is a side elevational view of the food preservation system prior to engagement with a modular sub-assembly;

FIG. 8 is a rear perspective view of the food preservation system with a modular sub-assembly inserted therein;

FIG. 9 is a side elevational view of the food preservation system of FIG. 6 with the modular sub-assembly inserted therein;

FIG. 10 is a rear cross-sectional elevational view of the food preservation system;

FIG. 11 is an enlarged rear cross-sectional view of the area XI of FIG. 10;

FIG. 12 is a front elevational view of the food preservation system with the component door in the open position;

FIG. 13 is an enlarged front partial elevational view of area XIII of FIG. 12;

FIG. 14 is an enlarged front partial perspective view of the distal end of a hose of the food preservation system of the present invention;

DETAILED DESCRIPTION OF EMBODIMENTS

Figure 16:
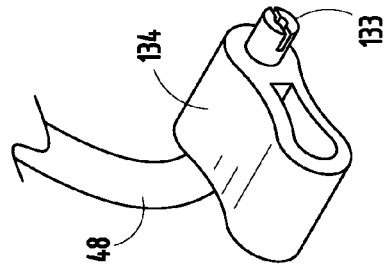
FIG. 16 is an enlarged top perspective view of a distal end of a hose of one embodiment of the food preservation system.

For purposes of description herein the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 20 shown in FIG. 1 generally designates a refrigerator having a cabinet 22 defining an open storage space 24 and including a door 26 having an interior side 28 adapted to receive a food preservation system in the form of a modular component 30. The modular component 30 has a base 32 removably connected to the interior side 28 of the door 26. A component door 38 has a viewing area 40 and is hingedly-connected to the base 32. The component door 38 is operable between an open position 42 (FIG. 12) and a closed position 44. The base 32 and component door 38 define a sealed compartment 46 when the component door 38 is in the closed position 44. An air hose 48 (FIG. 4) extends from the modular component 30 and has a proximal end 50 and a distal end 52. A fastening system 53 is disposed on one of the component door 38 and the base 32 and is adapted to seal the component door 38 against the base 32. A heat sealer 58 (FIG. 12) is disposed on one of the base 32 and the component door 38.

Referring again to FIG. 1, the refrigerator 20 may include a side-by-side door configuration or an upper and lower door configuration that provides for both a storage space for refrigerating food goods and a storage space for freezing food goods. It will be understood that the food preservation system of the present invention could be incorporated into the refrigeration storage space or the freezer storage space. A roll of bags 60 or sealing material is disposed below the modular component 30, although it is contemplated that the roll 60 could be positioned above the modular component 30 or elsewhere in the refrigerator 20. The roll 60 could also be left out of the refrigerator 20 to conserve space. As shown in FIG. 2, the modularity of the modular component 30 allows for the complete removal of the modular component 30 from the refrigerator 20. The modular component 30 includes all of the necessary internal devices to operate but requires a power source 62 to function. The power source 62 can extend from the refrigerator 20 itself or from a nearby power outlet 64. It is also contemplated that the modular component 30 could be powered by a battery source disposed in the modular component 30.

In one embodiment, a countertop support receives the modular component 30. The countertop support includes a power cord that connects with the power source 62. The countertop also includes a power relay connector that contacts a power port 66 (FIG. 5) thereby providing power to the modular component 30.

Referring now to FIG. 3, the food preservation system includes a grate 70 adapted to support a bag of food goods. A base rail 72 extends across the modular component 30 adjacent the second edge 36 of the base 32. The base rail 72 helps secure a bag of food goods on the grate 70. First and second sides 74, 76 of the base 32 include protrusions 78 adapted to be received in the interior side 28 of the door 26 to support the modular component 30 on the door 26. Modular component controls 80 that activate and deactivate the modular component 30 are disposed on a top portion of the base 32 above the component door 38. The fastening system 53 on the component door 38 includes first and second fasteners 84, 86 that are disposed on first and second sides 88, 90 of the component door 38 and allow the component door 38 to be temporarily sealed against the base 32. The component door 38 and base 32 define a sealed compartment 46 when the component door 38 is in the closed position 44, as will be disclosed in further detail below.

Referring again to FIGS. 4 and 5, the component door 38 includes a viewing area 40 that may be translucent or transparent. The power port 66 of the modular component 30 is designed to interface with a power relay 94 that extends from the interior side 28 of the door 26. The power port 66 engages when the modular component 30 is secured to the interior side 28 of the door 26. A housing panel 96 is disposed below the power port 66 and allows access to the interior of the modular component 30 if the modular component 30 needs to be inspected internally or repaired.

Referring now to FIGS. 6 and 7, the modular component 30 includes a receptacle 100 adapted to receive and interface with a removable modular sub-assembly 102. The receptacle 100 includes a power relay system 104 and an air coupling 106 such that the modular sub-assembly 102 can attach to an air coupling 107 on the modular sub-assembly 102 and influence the air pressure in both the sealed compartment 46 and the external hose 48 extending from the modular component 30. Fastener apertures 108 are designed to engage with fastener receivers 110 in the modular component 30 and receive mechanical fasteners 112 to secure the removable modular sub-assembly 102 during insertion into the modular component 30.

Referring now to FIGS. 8 and 9, after the modular sub-assembly 102 has been fully inserted into the modular component 30, the modular component 30 may be used to exploit the functionality of the modular sub-assembly 102. For example, in the event that the modular sub-assembly 102 includes a vacuum system 113 (FIGS. 20 and 21), then the modular component 30 may be used to activate a vacuum pump 114 to evacuate air from a sealable bag 116 or a sealable container 118 as disclosed in further detail below. As another example, in the event that the modular sub-assembly 102 includes a modified atmosphere system 120 (FIGS. 22 and 23), then the modular component 30 may be used to activate the vacuum pump 114 to evacuate air from the sealable bag 116 or the sealable container 118. The modified atmosphere system 120 activates a modified atmosphere canister 121, which supplies a predetermined air mixture to the depressurized bag 116 or container 118. It is contemplated that the vacuum pump 114 of the modular atmosphere system 120 could be used in a similar manner to the vacuum pump 114 in the modular sub-assembly 102 with the vacuum system 113, wherein the modular atmosphere canister 121 is not activated. Also, it is contemplated that the modular atmosphere canister 121 of the modular atmosphere system 120 may be used without the pump 114. As shown in FIG. 9, the modular sub-assembly 102 fits flushly against the rear of the modular component 30 and does not interface with the engagement of the modular component 30 to the interior portion 28 of the door 26 of the refrigerator 20.

Referring now to FIG. 10, an internal air hose 123 includes multiple portions that connect the air hose 123 to the modular sub-assembly 102. As shown in FIG. 10, the air hose 123 includes port lines that connect with first and second ports 122, 124 that open into the sealed compartment 46. The air hose 123 also includes a sensor line 126 that connects to a pressure sensor 128, which measures the pressure in the sealed compartment 46 and in the hose 48 during an air evacuation event. The internal air hose 123 connects the vacuum pump 114 with the first and second ports 122, 124, as well as with the external hose 48, as shown in FIG. 11. In the event the modular sub-assembly 102 includes the modular atmosphere system 120, then the modular atmosphere canister 121 would be tied into the internal air hose 123.

As shown in FIG. 12, the hose 48 includes a holder 132 adapted to support the hose 48 below the sealed compartment 46. In addition, a distal end 133 of the hose 48 includes a mount 134 designed to interface with a hose end receiver 136. The hose end receiver 136, as shown in FIGS. 13 and 14, is designed to receive the distal end 133 and mount 134 of the hose 48. In addition, the hose end receiver 136 is designed to provide a tight fit around the distal end 133 of the hose 48 such that little or no air is drawn into the hose 48 when the vacuum pump 114 is activated and the distal end 133 is engaged with the hose end receiver 136.

Figure 17:
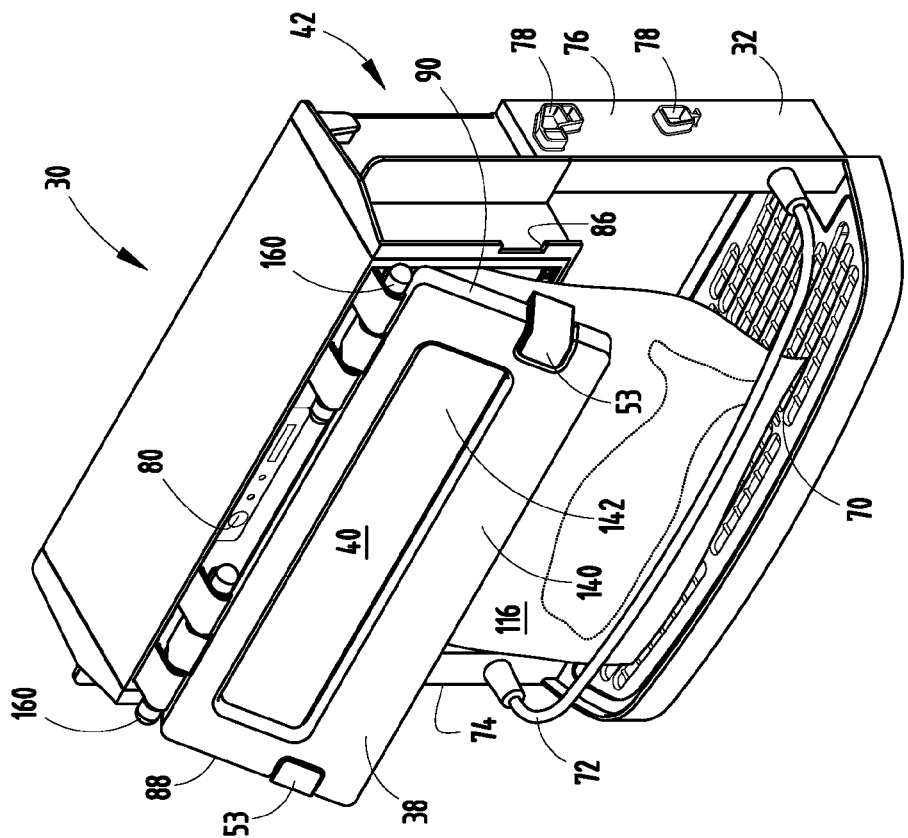
FIG. 17 is a top perspective view of the food preservation system of FIG. 15 prior to sealing a sealable bag.

Referring now to FIGS. 4 and 12, the component door 38 of the modular component 30 includes a component door front 140 with a window 142 that defines the viewing area 40. The viewing area 40 generally includes a translucent or transparent pane of material that allows a user to view the open end of the sealable bag 116 (FIG. 17). It is contemplated that the window 142 could be constructed from glass, plastic, fiberglass, or any other material that allows adequate light to pass through the window 142 and allows a user to see into the sealed compartment 46 when the component door 38 is in the closed position 44. First and second fasteners 84, 86 of the fastening system 53 are moveable into and out of secure engagement with the base 32. A gasket 148 is disposed between the component door 38 and the base 32. It is also contemplated that the fasteners 84, 86 can be magnetic fasteners. In this instance, the magnetic fasteners 84, 86 have opposite magnetic fields and are therefore attracted to one another thereby keeping the component door 38 in the closed position 44. Alternatively, the fastener 84 may be magnetized and the other fastener 86 may be a metal attracted to the magnetized fastener 84. Similarly, fastener 86 may be magnetized and attracted to metallic fastener 84.

Figure 15:
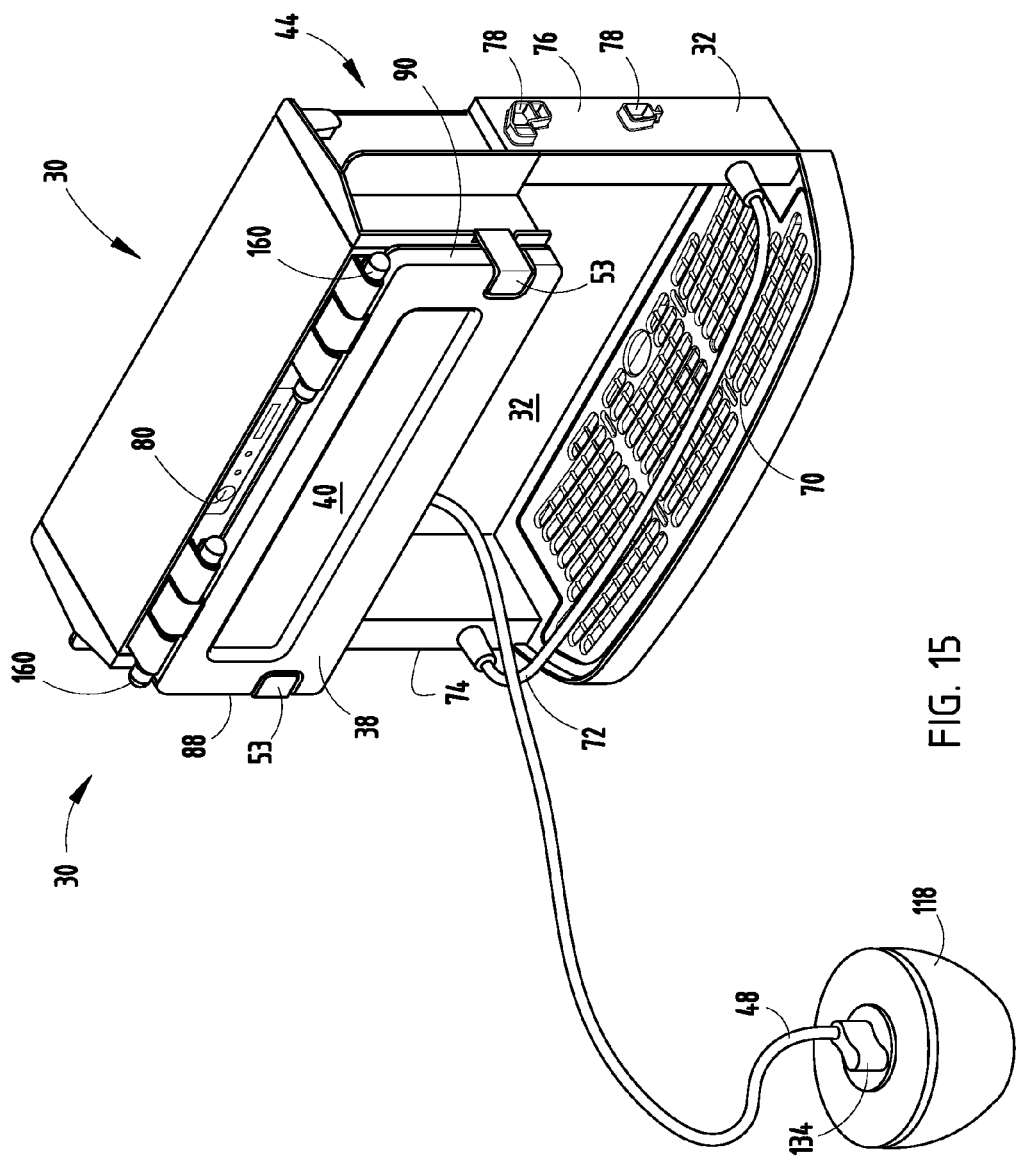
FIG. 15 is a top perspective view of one embodiment of the food preservation system of the present invention.

Referring now to FIGS. 12 and 15, when the component door 38 is in the closed position 44, an airtight seal is formed between the component door 38, the gasket 148 and the base 32 to form the sealed compartment 46. The versatile control panel or display 80 is disposed on the base 32 and controls the functions of the modular component 30. A magnetic sensor 152 is disposed on the base 32, which senses a magnet 154 disposed on an upper portion of the component door 38. When the component door 38 is in the closed position 44, the magnet 154 on the component door 38 engages the magnetic sensor 152. The magnetic sensor 152 then sends a signal to the modular component control panel 80 indicating that power to the modular sub-assembly 102 should be made available. If the component door 38 is open, then the magnet 154 on the component door 38 does not contact the magnetic sensor 152 and power to the modular sub-assembly 102 is not available.

Referring now to FIGS. 15 and 16, the air hose 48 is stored below the sealed compartment 46. The hose 48 is connected with the vacuum device 114 (depending on the modular sub-assembly 102 installed in the modular component 30), via the same internal air hose 123 that connects to the ports 122, 124. Thus depressurization of the sealed compartment 46 and depressurization of the external hose 48 occurs simultaneously. The external hose 48 is designed to draw air from the hard container 118 or the sealable bag 116. It is also contemplated that a valve assembly as understood by those having skill in the art could be used to facilitate air removal via the external hose 48 from the bag 116 or hard container 118. The external hose 48 may be extended and connected with the sealable container 118 and pressurize or depressurize the container 118.

Figure 18:
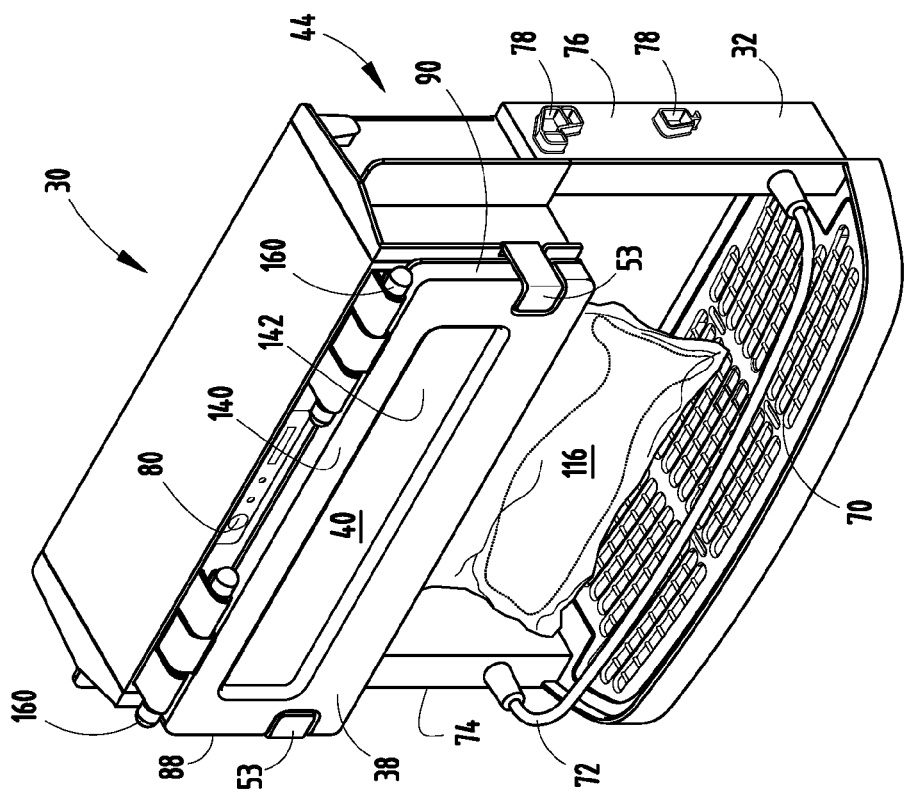
FIG. 18 is a top perspective view of the food preservation system of FIG. 15 sealing a sealable bag.
Figure 19:
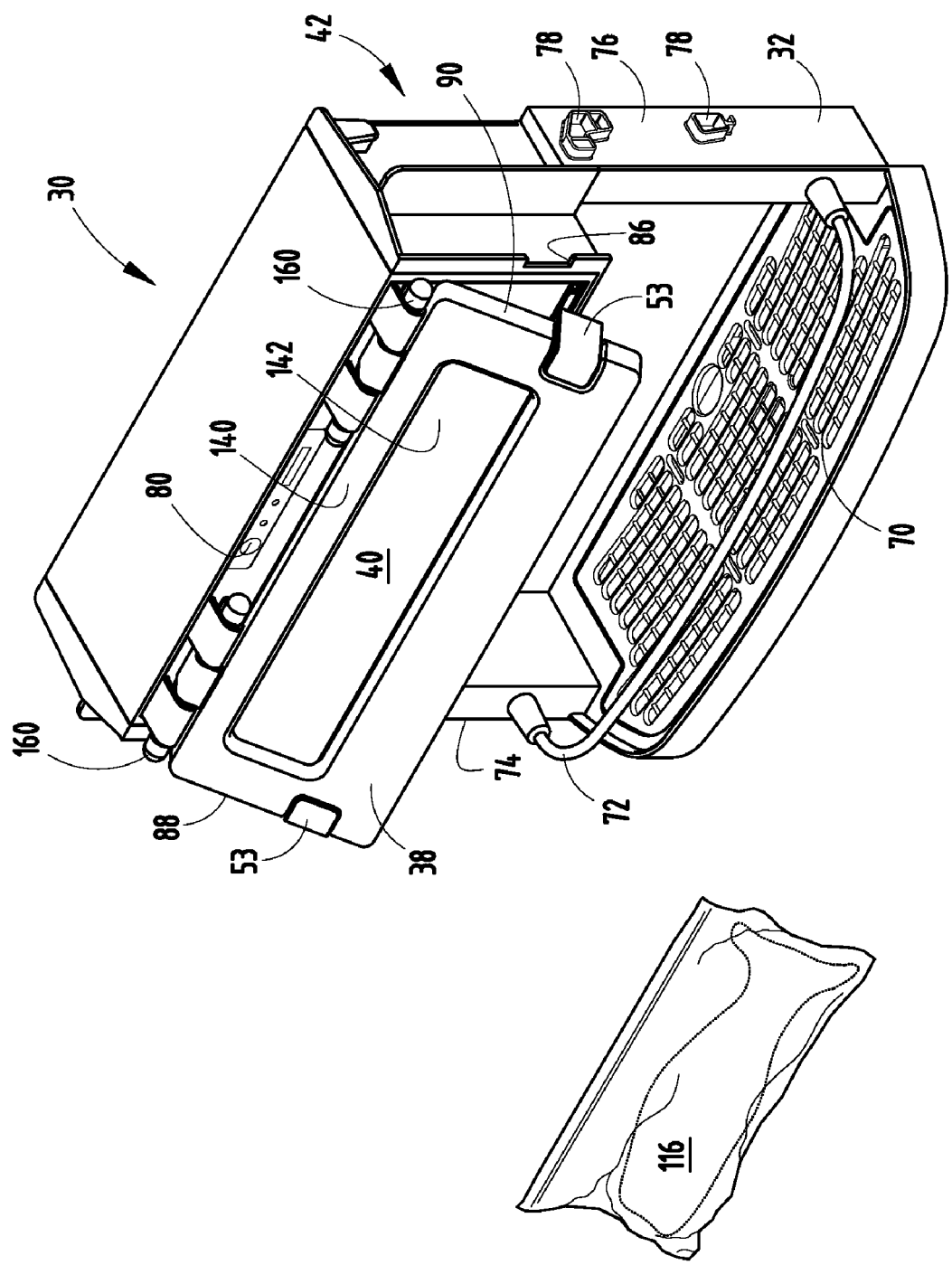
FIG. 19 is a top perspective view of the food preservation system of FIG. 15 after sealing a sealable bag.

Referring now to FIGS. 17-19, the component door 38 is rotatable about hinges 160 on the first edge 34 of the base 32. When the component door 38 is opened, the sealable bag 116 may be positioned within the open end between the component door 38 and the base 32. A bottom portion of the bag 116 is positioned on the grate 70 and held in place by the base rail 72 (FIG. 3). The component door 38 is then closed against the base 32 and the bag 116 is either sealed or vacuumed and sealed (FIG. 18). After the bag 116 has been vacuumed and the inside of the bag 116 has reached a predetermined negative pressure, the heat sealer 58 is activated. The heat sealer 58 (FIG. 12) includes a sealing plate 162 that rests against a bumper 164 when the component door 38 is in the closed position 44. The sealing plate 162 rises in temperature and consequently melts a portion of the bag 116 thereby melting two walls of the sealable bag 116 together. The sealing plate 162 may be disposed on the component door 38 in which case the bumper 164 is on the base 32 opposite the sealing plate 162. Alternatively, the sealing plate 162 may be disposed on the base 32, in which case the bumper 164 is on the component door 38 opposite the sealing plate 162. After the bag 116 has been sealed, the bag 116 is removed and the contents therein can be refrigerated or frozen. The modular component 30 is then ready to seal another sealable bag 116.

Figure 20:
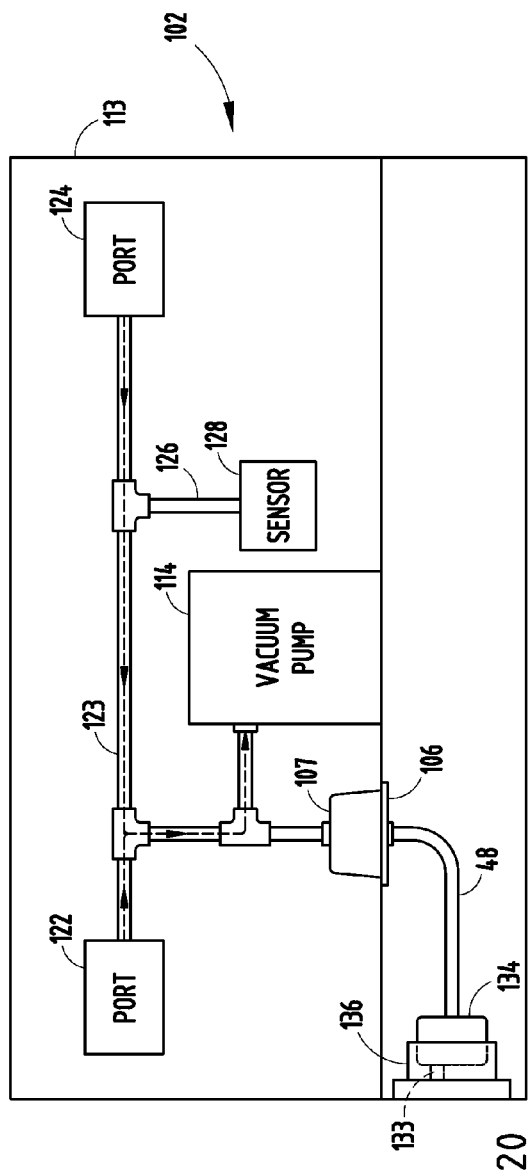
FIG. 20 is a diagram illustrating the construction of one embodiment of a modular sub-assembly having a vacuum system when evacuating air from a sealed compartment.
Figure 21:
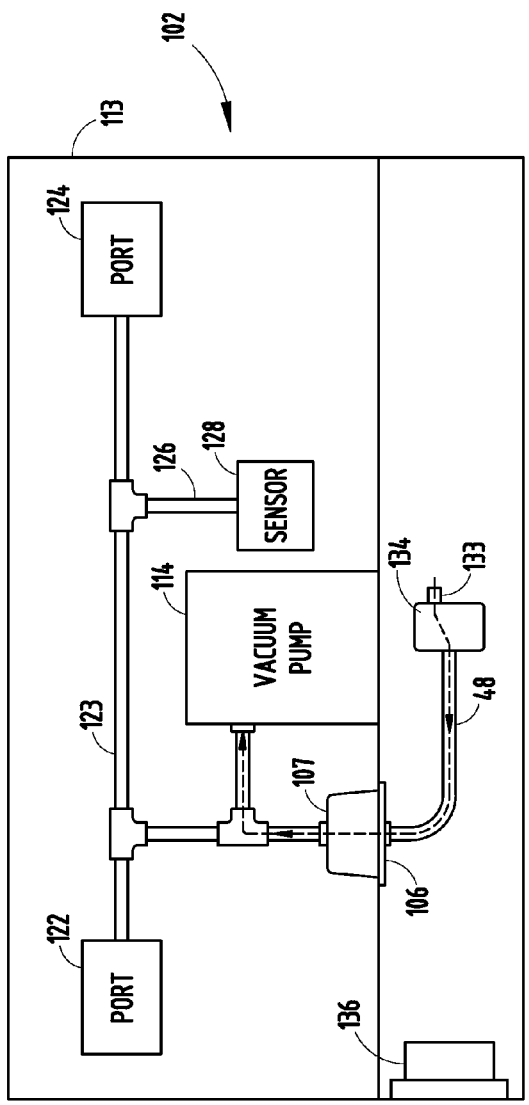
FIG. 21 is a diagram illustrating the construction of one embodiment of a modular sub-assembly having a vacuum system when evacuating air from the external hose.

Referring to FIGS. 20 and 21, a modular sub-assembly 102 having a vacuum system 113 is illustrated. The hose 48 extends between the first and second ports 122, 124, which draw air from the sealed compartment 46 when the vacuum pump 114 is activated. The hose 48 is connected by way of the internal hose 123 to the vacuum pump 114. The hose 48 also connects to the coupling 106, which allows communication of the internal hose 123 to the external hose 48. The pressure sensor 128 is connected to the sensor line 126 and, after a predetermined minimum air pressure has been reached, the pressure sensor 128 sends a signal to the vacuum pump 114 to deactivate. When air is being evacuated from the vacuum ports 122, 124 and consequently the sealed compartment 46, air is also being drawn from the external hose 48. However, no air is drawn into the external hose 48 while the mount 134 on the distal end 133 of the hose 48 is in contact with the hose end receiver 136. However, when the external hose 48 is removed from the hose end receiver 136, air is allowed to flow into the distal end 133 of the hose 48. Accordingly, the distal end 133 of the hose 48 can be connected with the sealable bag 116 or the hard container 118 for evacuation of air.

Figure 22:
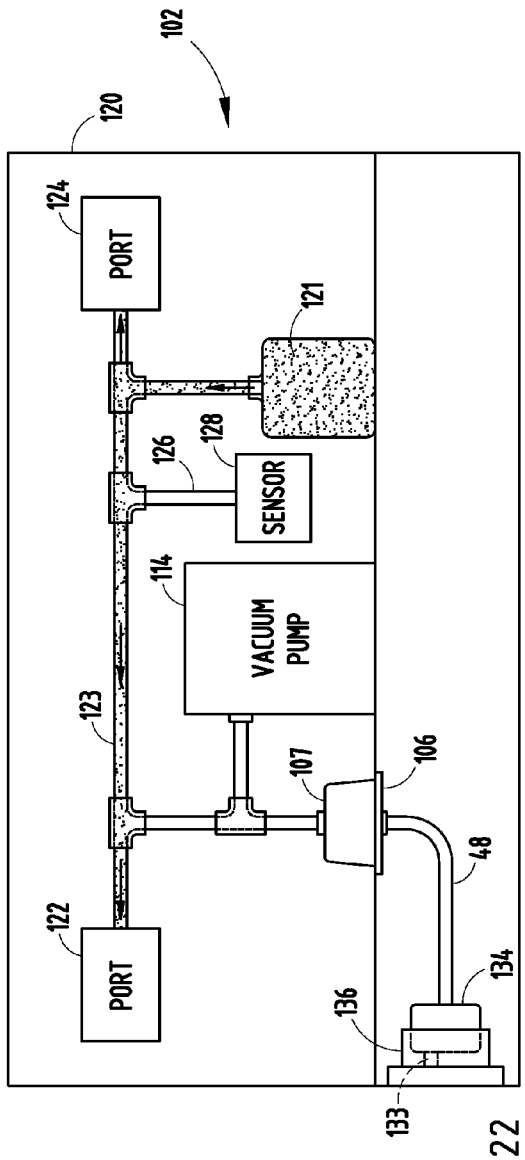
FIG. 22 is a diagram illustrating the construction of one embodiment of a modular sub-assembly having a modified atmosphere system and supplying air to a sealed compartment.
Figure 23:
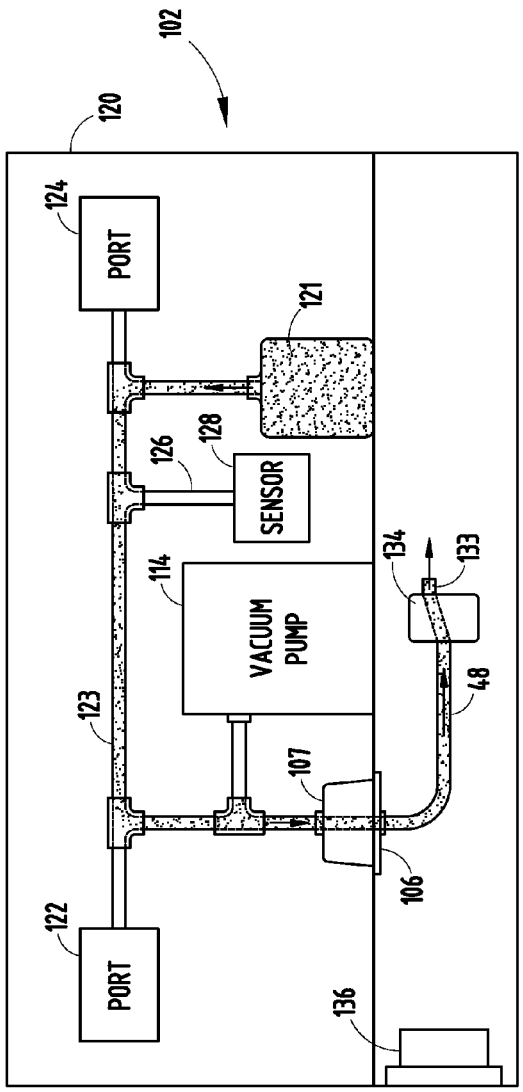
FIG. 23 is a diagram illustrating the construction of one embodiment of a modular sub-assembly having a modified atmosphere system and supplying air to an external hose.

Referring now to FIGS. 22 and 23, a modular sub-assembly 102 having a modified atmosphere system 120 is illustrated. When the modular sub-assembly 102 has the modified atmosphere system 120 installed in the modular component 30, the modified atmosphere system 120 first evacuates air from the relative sealed bag 116 or container 118. This is done by way of the sealed compartment 46, as explained above with reference to the vacuum pump 114, or by way of the external hose 48. After air has been evacuated from the sealable container 118 or sealable bag 116, and the air pressure in the container 118 or bag 116 has reached a predetermined air pressure level as determined by the sensor 128, the sensor 128 sends a signal to the vacuum pump 114 to deactivate. After deactivation of the vacuum pump 114, the modified atmosphere system 120 activates the modified atmosphere canister 121, which supplies a gas mixture to the bag 116 having an open end in the sealed compartment 46 (FIG. 22), or supplies a gas mixture through the internal hose 123 to the external hose 48 to the sealable bag 116 or sealable hard container 118. The gas mixture from the modified atmosphere canister 121 is drawn into the sealable bag 116 or hard container 118 by way of a negative pressure (which is preferably less than atmospheric pressure).

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A refrigerator comprising:
a cabinet defining an open storage space and including a door having an interior side adapted to receive a modular component, the modular component including:
a base removably connected to the interior side of the door;
a component door hingedly-connected to the base and including a viewing area, wherein the component door is operable between an open position and a closed position and wherein the base and the component door define a sealed compartment when the component door is in the closed position;
an air hose extending from the modular component and having a proximal end and a distal end;
a fastening system disposed on one of the component door and the base and adapted to engage with fasteners to create a seal between the component door and the base; and
a heat sealer disposed on one of the base and the component door.

2. The refrigerator of claim 1, further comprising:
a hose end receiver adapted to engage the distal end of the hose.

3. The refrigerator of claim 1, wherein the proximal end of the hose is connected with a vacuum device.

4. The refrigerator of claim 3, wherein the distal end of the hose is removably connected to a sealable storage container.

5. The refrigerator of claim 1, wherein the proximal end of the hose is connected with a modified atmosphere system.

6. The refrigerator of claim 5, wherein the distal end of the hose is removably connected to a sealable storage container.

7. The refrigerator of claim 5, wherein the fastening system includes first and second latches disposed on one of the base and the component door.

8. The refrigerator of claim 1, wherein the fastening system includes magnetic fasteners disposed on one of the base and the component door.

9. A modular component removably attachable to an interior compartment of a refrigerator comprising:
a base removably connected to the interior compartment;
a component door hingedly-connected to the base and having first fasteners, wherein the component door is operable between an open position and a closed position and wherein the base and component door define a sealed compartment when the component door is in the closed position;
second fasteners disposed on the base and adapted to detachably connect with the first fasteners on the component door;
a receptacle adapted to receive and interface with a removable modular sub-assembly;
a hose connected to the receptacle and in communication with the modular sub-assembly; and
a heat sealer disposed on one of the component door and the base.

10. The modular component of claim 9, wherein the removable modular sub-assembly includes a vacuum pump and wherein the vacuum pump may be activated to draw air from the hose and sealed compartment.

11. The modular component of claim 10, further comprising:
a sealable container having a sealable lid adapted to interface with a distal end of the hose.

12. The modular component of claim 10, further comprising:
a sealable bag having an open end received in the sealed compartment.

13. The modular component of claim 9, wherein the removable modular sub-assembly includes a modified air system and wherein the modified air system may be activated to push modified air into the hose and sealed compartment.

14. The modular component of claim 13, further comprising:
a sealable container having a sealable lid adapted to interface with a distal end of the hose.

15. The modular component of claim 13, further comprising a sealable bag having an open end received in the sealed compartment.

16. A method of modifying the contents of a sealable container, the method comprising:
providing a refrigerator having an interior portion;
providing a modular component with a base;
removably connecting the modular component to the interior portion of the refrigerator;
hingedly-connecting a component door to the base wherein the component door is operable between an open position and a closed position and wherein the base and the component door define a sealed compartment when the component door is in the closed position;
inserting a removable modular sub-assembly into the modular component;
providing a hose in communication with the modular sub-assembly; and
connecting a heat sealer to one of the component door and the base.

17. The method of claim 16, the method further comprising:
connecting the hose to the sealed compartment.

18. The method of claim 17, the method further comprising:
connecting the hose to an external sealable container.

19. The method of claim 16, wherein the step of inserting a removable modular sub-assembly further comprises:
providing a vacuum pump in the removable modular sub-assembly.

20. The method of claim 16, wherein the step of inserting a removable modular sub-assembly further comprises:
providing a modified atmosphere system in the removable modular sub-assembly.

* * * * *